Patented July 2, 1940

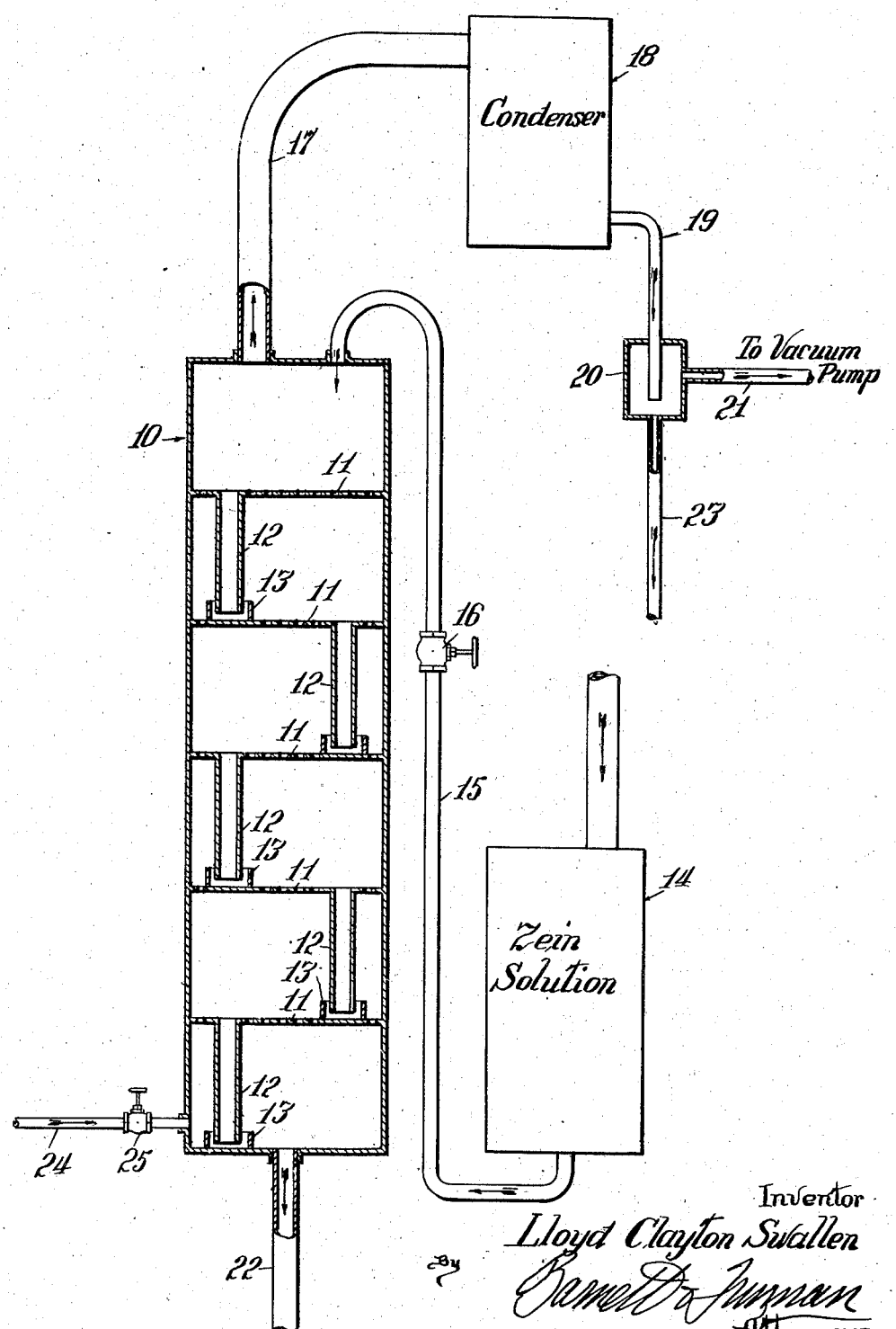

2,206,310

UNITED STATES PATENT OFFICE 2,206,310

TREATMENT OF ZEIN SOLUTIONS

Lloyd Clayton Swallen, Pekin, Ill., assignor, by mesne assignments, to Corn Products Refining Company, New York, N. Y., a corporation of New Jersey Application August 2, 1937, Serial No. 156,991
Renewed April 20, 1939

9 Claims.  (Cl. 260—123)

This invention relates to the preparation of zein; and a primary object of the invention is to provide a new and improved process for removing oil and coloring matter from a zein solution without leaving any appreciable quantity of the hydrocarbon oil solvent in the solution.

If the zein solvent contains water, as will be the case if the zein is produced by extraction with an aqueous alcohol solution, a further object of the invention is to provide for removing some of the water from the mixture treated so as to reduce the water content of the solvent in the purified solution resulting from the treatment contemplated by this invention.

A solution treated so that the maize-oil and coloring matter is completely removed without leaving any of the hydrocarbon oil solvent in the solution is desirable for several reasons: If the zein is to be precipitated from the solution with water and dried, any hydrocarbon present in the solution will be precipitated with the zein and will not be readily separated from it either before or after drying. Consequently, unless the hydrocarbon is completely removed, contamination of the zein results together with loss of the oil solvent. Furthermore, for many uses it is desirable to have the zein in the form of an alcohol solution. A material saving will be effected if the solution can be prepared free from the oil solvent and in a relatively stable condition instead of by precipitating, drying, and re-dissolving the material. Water content is one of the factors controlling stability; and the subordinate object of the invention referred to above provides a convenient and inexpensive expedient for regulating the water content, or in other words alcohol concentration, of the finished solution.

A zein solution of the type contemplated by this invention may be produced in accordance with the process disclosed in co-pending application of Lloyd C. Swallen, Serial No. 20,401, filed May 8, 1935, now Patent No. 2,105,760. According to this process the zein is extracted from gluten meal with an aqueous ethyl alcohol solution of 92% strength, which may be varied within the range of approximately 88%–95%, for two hours, more or less, at a temperature of 60° C., practical temperatures ranging from 55° to 65° C. (131°–149° F.) more or less. The alcohol percentage is by volume whenever referred to herein.

The extract may be clarified in any suitable manner, for example, in accordance with the process disclosed in copending application of Lloyd C. Swallen, filed July 26, 1937, Serial No. 155,691. The clarification step is not, however, an essential part of the present invention.

According to copending application of Lloyd C. Swallen, Serial No. 20,402, filed May 8, 1935, now Patent No. 2,133,591, a hydrocarbon solvent of maize-oil and coloring matter is mixed with the extract, the mixture allowed to stand until it separates into two liquid layers, the quantity of the oil solvent being sufficient to cause this separation into two liquid phases, which may be effected by gravity or centrifugal force. The lower, heavier layer contains zein, alcohol, some oil solvent (toluol being the preferred oil solvent of application Serial No. 20,402) and some water. The light, supernatant layer in the case of a gravity separation contains most of the toluol, alcohol, oil, coloring matter and a small amount of water. The light supernatant liquid is removed, and if desired, the heavy liquid is given another extraction with oil solvent of the same character; and this operation may be repeated as often as necessary.

However, according to this process the final solution will contain some of the oil solvent; and this is undesirable for the reasons above stated.

According to the present invention the mixture of zein solution and oil solvent, preferably after one or more gravity separations of the type above described, is first diluted with additional alcohol, in order to give it stability under the subsequent processing steps, although this is not always necessary, and is then subjected to a distilling operation which removes from the liquid treated substantially all of the oil solvent and some water. The oil solvent should be miscible, or at least partially miscible with the zein solvent—and the term "miscible" is intended to cover partial miscibility—and should not, of course, be a solvent of zein. Preferably vapors of alcohol are introduced into the liquid under distillation so as to displace, by their condensation, the oil solvent in the mixture.

Preferably, benzol is used as an oil solvent in place of toluol because of the lower boiling point of benzol. It is possible to use toluol but because of its higher boiling point the process is relatively inefficient, and requires a larger equipment and the use of more alcohol.

If it is desired to reduce the water content in the purified solution, that is to produce a solution having a relatively high alcohol concentration, which is advantageous in order that the solution be as stable as possible against denaturization, (i. e. the insolubilizing of the soluble gluten) an increased amount of water may be driven off from the mixture treated during the distilling operation, by adding benzol and alcohol to the solution before distilling; or by gradually introducing into the liquid undergoing distillation additional amounts of benzol at such a rate that the solution remains homogeneous.

The distillation may be carried out in any suitable form of apparatus by either a batch process or a continuous process. In order to minimize the detrimental effect of high temperature on the zein, it is preferable to operate at vacuum corresponding to temperatures of 40° C. to 47° C. (104°–117° F.). Lower temperatures than these could be used but would necessitate refrigeration apparatus on the condenser.

The solvents leaving the zein solutions as vapors can be fractionated in any desired manner and the distillates re-used in the process so that none of either of the solvents needs to be lost.

The drawing hereto appended is a diagrammatic showing of a form of continuous distilling apparatus suitable for carrying out the process.

The following are specific examples of the application of the invention to practice. These examples are merely informative and illustrative of the process. They are not to be considered as limiting the invention to the particular operating data given.

Example 1

A zein solution containing 6 grams of zein per 100 cubic centimeters of solvent is prepared by extracting gluten meal with 92% aqueous alcohol in the manner described above. The solution is clarified by settling and filtering; or by the more elaborate methods disclosed in the aforesaid copending application Serial No. 155,691. To 200 gallons of this solution is added 260 gallons of benzol and the mixture is agitated for five minutes and allowed to settle for an hour. The lighter supernatant liquid layer containing 0.06 gram of protein per 100 cubic centimeters of liquid is drawn off leaving 42 gallons of heavy zein solution containing 28 grams of zein per 100 cubic centimeters of liquid and having a solvent mixture consisting of 33% benzol, 52% alcohol and 15% of water by weight. The heavy zein solution is diluted with 12 gallons of 92% alcohol. The diluted solution is then run into an evacuated kettle maintained at a vacuum of 24 inches to 26 inches of mercury, and the vapors of 92% alcohol are introduced into the liquid in the kettle until the benzol has been completely displaced. The resulting solution contains 23 grams of protein per 100 centimeters of solvent. The solvent consists of 88% alcohol. No benzol is detectable.

Example 2

If it is desired to increase the alcohol concentration of the final solution the procedure of Example 1 is modified by adding to the heavy zein solution a mixture of ten gallons of benzol and five gallons of alcohol in place of the twelve gallons of alcohol used in said example.

Example 3

Referring to the drawing, 10 designates a still column provided with five perforated plates 11, from each of which leads a pipe 12 to a seal cup 13 on the plate below, except that the lower seal cup is on the bottom of the still. 14 designates a supply tank for the zein solution which is connected to the top of the still column by pipe 15 having a feed control valve 16. The vapor pipe 17 leads from the top of the still to a surface condenser 18, the discharge pipe 19 from which extends into a casing 20 connected by pipe 21 with the vacuum apparatus. The still column has a barometric leg 22 and the condenser a barometric leg 23. 24 is a pipe leading into the bottom section of the still column from the alcohol still (not shown).

The zein solution, diluted as in Example 1, is introduced into the top of the still column at the rate of one gallon per minute. Alcohol vapors corresponding to 92% alcohol, are introduced in the bottom section of the column, through pipe 24, at such a rate (controlled by valve 25) that the distillate will contain approximately 55% benzol by volume. The column is held under such a vacuum that the temperature at the bottom of the column is 41° to 42° C. and the temperature at the top 32° to 34° C. (90° to 93° F.). The vapors from the still column are run to the condenser 18, from which the condensate is removed through the barometric leg 23. The zein solution from the bottom of the still column passes through the barometric leg 22. It is substantially benzol free and the solvent has an alcohol concentration of 88%.

Example 4

If it is desired to decrease the water content of the benzol free solution, this may be done in the process of Example 3 by introducing benzol little by little into the still column while the distillation is in progress and at such a rate that the solution remains at all times homogeneous.

It is the intention to cover all equivalents of the procedures specified and all modifications thereof within the scope of the appended claims.

I claim:

1. Process of treating an aqueous alcohol solution of zein which comprises: mixing benzol with the solution in quantity sufficient to bring about a separation of the mixture into a heavy liquid containing zein, alcohol, water and some benzol, and a lighter liquid containing oil, coloring matter, benzol and alcohol; separating said heavy and lighter liquids one from the other and subjecting the heavy liquid to a distilling operation in a vacuum corresponding to a temperature between 40° and 47° C. (104°–117° F.) to prevent denaturing of the zein to remove the benzol therefrom in the distillate.

2. Process of treating an aqueous alcohol solution of zein which comprises: mixing benzol with the solution in quantity sufficient to bring about a separation of the mixture into a heavy liquid containing zein, alcohol, water and some benzol, and a light liquid containing oil, coloring matter, benzol and alcohol; separating said heavy and lighter liquids one from the other; diluting the heavy liquid with alcohol; and then subjecting the diluted liquid to a distilling operation in a vacuum corresponding to a temperature between 40° and 47° C. (104°–117° F.) to prevent denaturing of the zein to remove the benzol therefrom in the distillate.

3. Process of treating an aqueous alcohol solution of zein which comprises: mixing benzol with the solution in quantity sufficient to bring about a separation of the mixture into a heavy liquid containing zein, alcohol, water and some benzol, and a lighter liquid containing oil, coloring matter, benzol and alcohol; separating said heavy and lighter liquids one from the other; and subjecting the heavy liquid to a distilling operation in which alcohol vapors are introduced into the liquid treated to displace the benzol therein.

4. Process of treating an aqueous alcohol solution of zein which comprises: mixing benzol with the solution in quantities sufficient to bring about a separation of the mixture into a heavy liquid containing zein, alcohol, water and some benzol, and a light liquid containing oil, coloring matter, benzol and alcohol; separating said heavy and lighter liquids one from the other; diluting the heavy liquid with alcohol; and subjecting the diluted liquid to a distilling operation in which alcohol vapors are introduced into the liquid treated to displace the benzol therein.

5. Process of treating an aqueous alcohol solution of zein which comprises: mixing benzol with the solution in quantity sufficient to bring about a separation of the mixture by gravity into a heavy liquid containing zein, alcohol, benzol and water, and a light liquid containing oil, coloring matter, alcohol and benzol; separating said heavy and lighter liquids one from the other; and subjecting the heavy liquid to a distilling operation in which alcohol vapors are introduced into the liquid treated; benzol being added to the solution in such quantity as to bring about a reduction of the water content of the purified solution.

6. Process of treating an aqueous alcohol solution of zein which comprises: mixing benzol with the solution in quantity sufficient to bring about a separation of the mixture by gravity into a heavy liquid containing zein, alcohol, benzol and water, and a light liquid containing oil, coloring matter, alcohol and benzol; separating said heavy and lighter liquids one from the other; subjecting the heavy liquid to a distilling operation in which alcohol vapors are introduced into the liquid treated; and introducing benzol into the solution during the distilling operation in such quantity as to bring about a reduction of the water content of the purified solution.

7. Process of preparing zein in the form of a solution free from maize-oil, coloring matter, and the solvent thereof which comprises: extracting zein from maize gluten with an aqueous alcohol solution of 88%–95% concentration at a temperature of 55°–65° C. (131°–149° F.); mixing with the solution a sufficient quantity of benzol to bring about separation of the mixture into a light liquid and a heavy liquid; separating said light and heavy liquids one from the other; diluting the heavy liquid with alcohol; and subjecting the diluted liquid to a distilling operation in which alcohol vapors are introduced into the liquid treated to displace the benzol.

8. Process of preparing zein in the form of a solution free from maize-oil, coloring matter, and the solvent thereof which comprises: extracting zein from maize gluten with an aqueous alcohol solution of 88%–95% concentration at a temperature of 55°–65° C. (131°–149° F.); mixing with the solution a sufficient quantity of benzol to bring about separation of the mixture into a light liquid and a heavy liquid, the latter containing most of the zein; separating said light and heavy liquids one from the other; adding to the heavy zein-containing liquid, alcohol and benzol; and subjecting the zein-containing liquid mixture to a distilling operation in which alcohol vapors are introduced into the liquid treated to displace the benzol.

9. Process of treating an aqueous alcohol solution of zein which comprises: mixing with the solution a maize oil solvent partially miscible with an aqueous alcohol solution of zein, not a solvent of zein and sufficiently volatile to be removable from an alcoholic solution by distillation in quantity to bring about a separation of the mixture into a heavy liquid containing zein, alcohol, water and some of the maize oil solvent, and a lighter liquid containing oil, coloring matter, maize oil solvent, and alcohol; separating said heavier and lighter liquids, one from the other; and subjecting the heavy liquid to a distilling operation in a vacuum corresponding to a temperature of about 40°–47° C. (104°–117° F.), to prevent denaturing of the zein, to remove the maize oil solvent therefrom in the distillate.

LLOYD CLAYTON SWALLEN.